United States Patent
Yamanobe et al.

(10) Patent No.: US 9,000,355 B2
(45) Date of Patent: Apr. 7, 2015

(54) OPTICAL SENSOR

(71) Applicant: Alpine Electronics, Inc., Tokyo (JP)

(72) Inventors: Masato Yamanobe, Fukushima (JP); Tetsuji Suenaga, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 313 days.

(21) Appl. No.: 13/729,716

(22) Filed: Dec. 28, 2012

(65) Prior Publication Data
US 2013/0240717 A1    Sep. 19, 2013

(30) Foreign Application Priority Data
Mar. 15, 2012  (JP) .................................. 2012-059328

(51) Int. Cl.
*G01J 1/42* (2006.01)
*G01J 1/16* (2006.01)
*G01V 8/20* (2006.01)

(52) U.S. Cl.
CPC .... *G01J 1/42* (2013.01); *G01J 1/16* (2013.01); *G01V 8/20* (2013.01)

(58) Field of Classification Search
USPC .................. 250/227.11–227.24, 239; 345/158
See application file for complete search history.

(56) References Cited

U.S. PATENT DOCUMENTS

| | | | | |
|---|---|---|---|---|
| 5,233,177 | A * | 8/1993 | Kobayashi et al. | 250/208.1 |
| 6,753,849 | B1 * | 6/2004 | Curran et al. | 345/158 |
| 8,519,981 | B2 * | 8/2013 | Kurokawa et al. | 345/175 |
| 8,723,102 | B2 * | 5/2014 | Unterborsch et al. | 250/227.11 |
| 8,901,480 | B2 * | 12/2014 | Michiyama et al. | 250/239 |

FOREIGN PATENT DOCUMENTS

JP    2001-194232    7/2001

* cited by examiner

*Primary Examiner* — Tony Ko
(74) *Attorney, Agent, or Firm* — Brinks Gilson & Lione

(57) ABSTRACT

A monitor-light-emitting device and multiple light-emitting devices are mounted on a board, and a light-guiding member is disposed in front of these devices. Monitor light emitted from the monitor-light-emitting device is directly supplied to a light receiving device. Part of light emitted from the multiple light-emitting devices is incident on the light-guiding member and is used as reference light. The reference light is received by the light receiving device. Reflected detection light that has been reflected off a target object located in front of the optical sensor is transmitted through the light-guiding member and is received by the light receiving device. A condenser is disposed in front of the light receiving device and the reference light or the reflected detection light is efficiently supplied to the light receiving device.

8 Claims, 5 Drawing Sheets

OPTICAL SENSOR

PRIORITY CLAIM

This application claims the benefit of Japanese Patent Application No. 2012-059328, filed on Mar. 15, 2012, and which is incorporated by reference herein in its entirety.

BACKGROUND

1. Field of the Invention

The present invention relates to an optical sensor that emits light and detects the reflected light to determine if there is a target object in front of the sensor.

2. Description of the Related Art

Certain optical sensors that detect whether or not there is a human body or hand in front of an electronic device are known.

In an optical sensor described in Japanese Unexamined Patent Application Publication No. 2001-194232, a light emitting portion and a light receiving portion are arranged side by side on a substrate and a transparent board is disposed in front of the light emitting portion and the light receiving portion. When infrared rays emitted from the light emitting portion pass through the transparent board to the front and are reflected off a target object in front of the transparent board, the reflected light is received by the light receiving portion. By monitoring the amount of light received by the light receiving portion, it is determined whether or not there is a target object in front of the sensor.

In the optical sensor described in Japanese Unexamined Patent Application Publication No. 2001-194232, the light receiving portion receives not only the light reflected off the target object but natural light such as sunlight. Thus, when strong natural light is supplied to the sensor of an electronic device, the accuracy with which the sensor detects a target object decreases.

In view of the circumstances, the following configuration is conceived of in order to compensate for the decrease in detection accuracy due to the natural light. Specifically, in the configuration, a light-guiding member made of a light-transmissive material is disposed in front of the light emitting portion and the light receiving portion so as to guide some infrared rays emitted forward from a detection-light-emitting portion, so that those rays are received by the light receiving portion. Further, the light-guiding member guides infrared rays emitted from a monitor-light-emitting device to cause the light receiving portion to receive the light. The amount of light received by the light receiving portion after being emitted from the detection-light-emitting portion and the amount of light received by the light receiving portion after being emitted from the monitor-light-emitting device are compared to each other so that the decrease in detection accuracy is compensated for.

The optical sensor having the above configuration, however, needs to be adjusted such that the amount of light received by the light receiving portion after being emitted from the detection-light-emitting portion is balanced with the amount of light received by the light receiving portion after being emitted from the monitor-light-emitting device. Such an optical sensor is difficult to design. Particularly, if the optical sensor includes multiple detection-light-emitting portions, balancing of the amounts of received light becomes more difficult.

SUMMARY

Embodiments of the present invention have been made to solve the existing problems, and an object of the present invention is to provide an optical sensor employing a configuration in which a light receiving device receives light emitted from a light-emitting device and light reflected off a target object, the optical sensor being capable of receiving detection light and monitor light while achieving the right balance between the amounts of received detection light and received monitor light.

An aspect of the present invention is an optical sensor including a monitor-light-emitting device that emits light at a first timing; a detection-light-emitting device that emits light at a second timing different from the first timing; a light receiving device arranged side by side with the monitor-light-emitting device and the detection-light-emitting device; and a light-guiding member disposed in front of the detection-light-emitting device and the light receiving device. In the sensor, reference light of the light emitted from the detection-light-emitting device and penetrating into the light-guiding member propagates through the light-guiding member and is received by the light receiving device, and reflected detection light of the light emitted from the detection-light-emitting device, transmitted through the light-guiding member, and reflected off a target object located in front of the optical sensor, is guided by the light-guiding member and received by the light receiving device. A visor portion is disposed between the monitor-light-emitting device and the light-guiding member, and monitor light of the light emitted from the monitor-light-emitting device is capable of being directly incident on the light receiving device. Whether the target object is present or not is determined on the basis of an output of light received by the light receiving device when the detection-light-emitting device emits light and an output of light received by the light receiving device when the monitor-light-emitting device emits light.

In the optical sensor according to the above aspect of the present invention, the monitor light emitted from the monitor-light-emitting device is directly received by the light receiving device. Thus, adjusting of the amount of received monitor light is facilitated, and consequently, balancing of the amounts of received monitor light and received reference light is facilitated.

Preferably, a portion of the light-guiding member is formed into a condenser, which has a light-emerging surface and a slope, the light-emerging surface facing the light receiving device, the slope extending from the light-emerging surface such that the condenser is widened in a lateral direction, in which the monitor-light-emitting device and the detection-light-emitting device are arranged, toward the front. Preferably, the monitor-light-emitting device faces the slope.

Providing a condenser at a portion of the light-guiding member in the above described manner allows only a small amount of the monitor light to be incident on the light-guiding member from the monitor-light-emitting device and facilitates direct application of the monitor light to the light receiving device. On the other hand, the reference light propagating through the light-guiding member and the reflected detection light penetrating into the light-guiding member are efficiently guided to the light receiving device.

Preferably, the light-guiding member includes a detection-light transmitting portion, which faces the detection-light-emitting device, and a light-guiding portion, which is positioned between the detection-light transmitting portion and the slope. Preferably, the thickness of the light-guiding portion in a front-rear direction is smaller than the thickness of the detection-light transmitting portion in the front-rear direction.

In the above configuration, light emitted from the detection-light-emitting device is made more likely to be transmitted to the front through the detection-light transmitting portion, and the reference light emitted from the detection-light-emitting device and penetrating into the light-guiding member is guided to the light receiving device without being attenuated in the light-guiding portion by a large amount. Consequently, regarding the light emitted from the detection-light-emitting device, adjusting of the amount of reference light propagating through the light-guiding member and the amount of light passing through to the front is facilitated.

Preferably, the light-guiding portion and the detection-light transmitting portion are molded by different part-molding molds.

The use of the part-molding molds facilitates fixing of the thicknesses of the light-guiding portion and the detection-light transmitting portion in the front-rear direction in accordance with usage conditions or various other conditions.

Preferably, the detection-light-emitting device includes a first detection-light-emitting device and a second detection-light-emitting device. Preferably, the second detection-light-emitting device is disposed farther from the light receiving device than the first detection-light-emitting device is. Preferably, a guide slope is formed in a portion of the light-guiding member between the first detection-light-emitting device and the second detection-light-emitting device, the guide slope being inclined in such a direction as to become gradually separated from the second detection-light-emitting device toward the rear.

The use of multiple detection-light-emitting devices as in the above case can reduce the difference between the amounts of second reference light and first reference light that are supplied into the light-guiding member, the second reference light being emitted from the second detection-light-emitting device positioned away from the light receiving device, the first reference light being emitted from the first detection-light-emitting device positioned near the light receiving device.

In the optical sensor according to the aspect of the present invention, it is easy to balance the following amounts, that is, the amount of monitor light received by the light receiving device after being emitted from the monitor-light-emitting device and directly transmitted to the light receiving device; the amount of reference light received by the light receiving device after being emitted from the detection-light-emitting device, guided through the light-guiding member, and supplied to the light receiving device; and the amount of reflected detection light received by the light receiving device after being emitted by the detection-light-emitting device and reflected off a target object. Thus, the detecting operation can be performed highly accurately.

DETAILED DESCRIPTION

Figure 1:
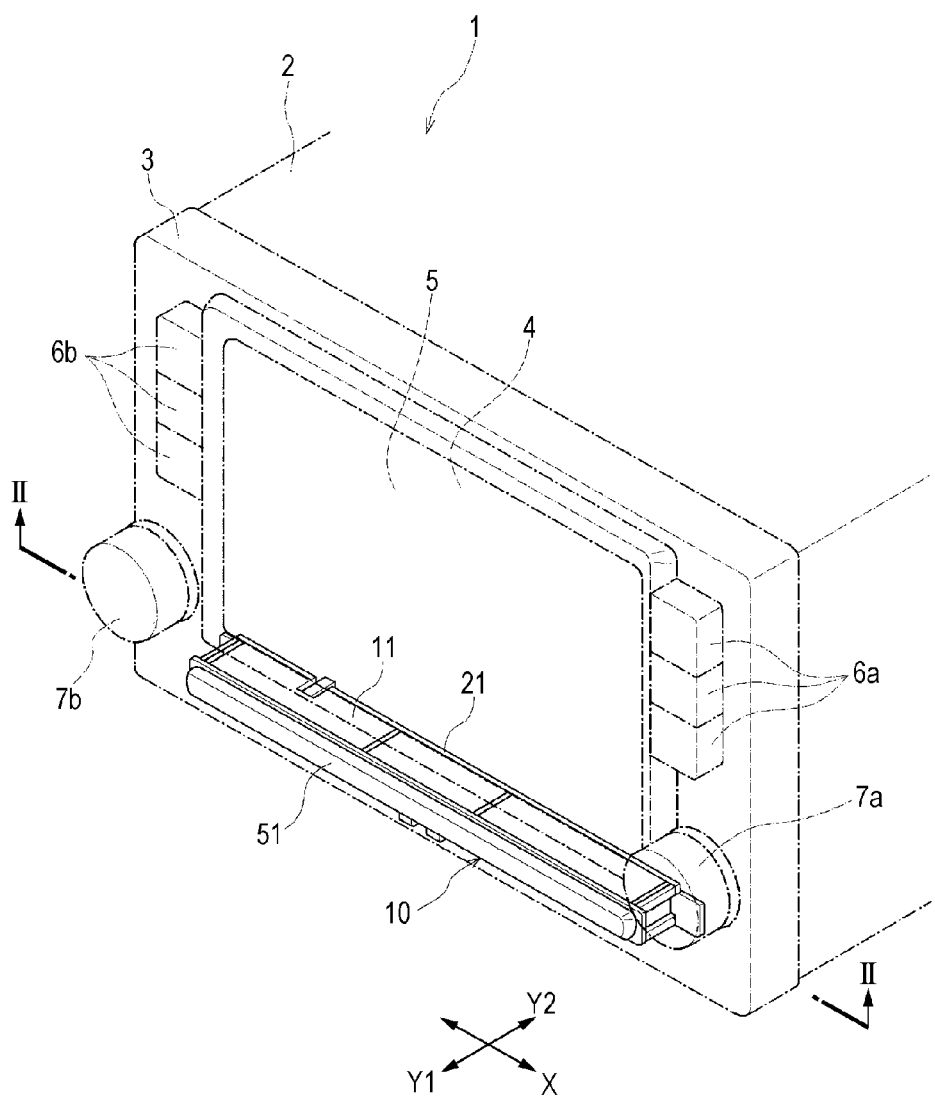
FIG. 1 is a perspective view of an electronic device having an optical sensor according to an embodiment of the present invention.

FIG. 1 illustrates an in-vehicle display device 1 as an example of an electronic device. The in-vehicle display device 1 is used as a car navigation system, a driving information display device, or an interior-condition display device.

The in-vehicle display device 1 includes a housing and a panel 3 in front of the housing 2. In the panel 3, a display window 4 is open, and a display panel screen 5 such as a liquid-crystal display panel appears through the display window 4. Push-button controllers 6a and 6b and rotary controllers 7a and 7b are attached to the front surface of the panel 3.

An optical sensor 10 is disposed on the panel 3 below the display window 4. The optical sensor 10 emits infrared rays to the front of the panel 3 (in the Y1 direction). When a human hand or another object approaches the front of the panel 3, some rays are reflected off the hand or the like and the reflected rays are detected by the optical sensor 10. A controller (not illustrated) disposed inside the housing 2 performs display controls, such as switching the content displayed on the screen 5, when light reflected off the human hand or the like is detected.

Figure 2:
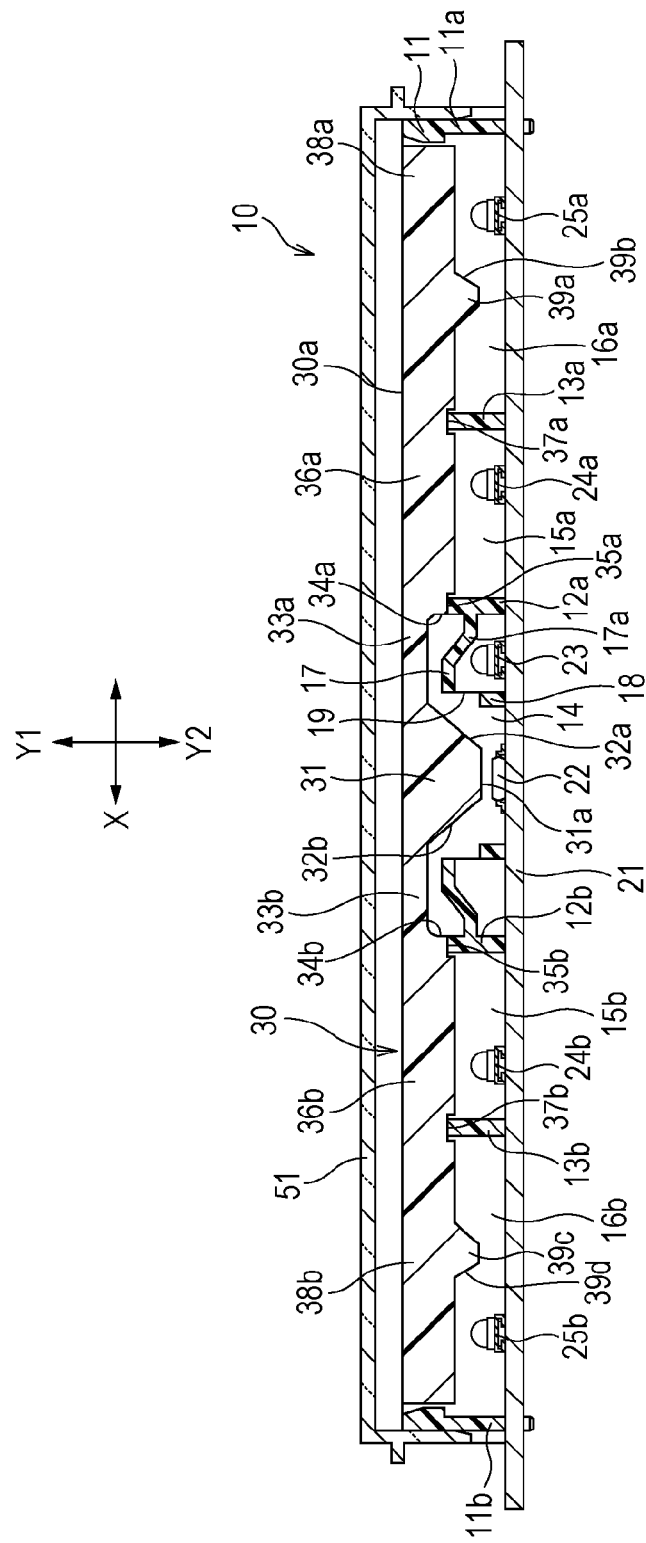
FIG. 2 is a cross sectional view of the optical sensor illustrated in FIG. 1 and taken along the line II-II.

In the cross sectional view of the optical sensor 10 illustrated in FIG. 2, the Y1 direction denotes the direction to the front of the panel 3, and the Y2 direction denotes the direction to the rear of the panel 3, that is the direction toward the housing 2.

The optical sensor 10 includes a casing 11. The casing 11 has a rectangular tube shape that is hollow throughout and open to the front (in the Y1 direction) and to the rear (in the Y2 direction). The longitudinal direction of the casing 11 is in the X direction.

As illustrated in FIG. 2, the casing 11 having a rectangular tube shape contains a first right partition wall 12a, a first left partition wall 12b, a second right partition wall 13a, and a second left partition wall 13b, which are integrally formed.

The first right partition wall 12a and the first left partition wall 12b define a light-receiving space 14. The first right partition wall 12a and the second right partition wall 13a define a first right light-emitting space 15a, and the first left partition wall 12b and the second left partition wall 13b define a first left light-emitting space 15b. The second right partition wall 13a and a right end wall 11a of the casing 11 define a second right light-emitting space 16a, and the second left partition wall 13b and a left end wall 11b of the casing 11 define a second left light-emitting space 16b.

Figure 3:
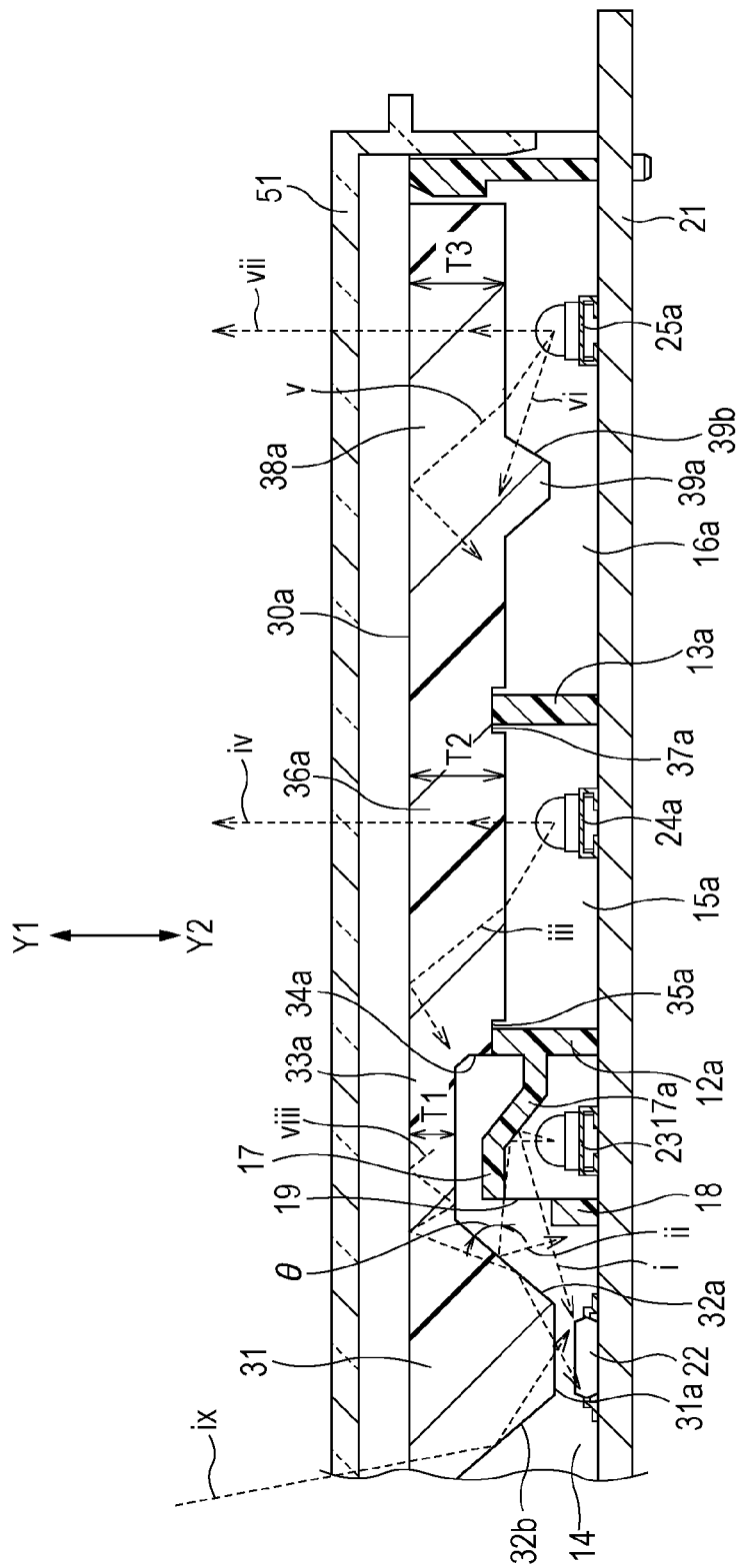
FIG. 3 is a cross sectional view in which a right half of the cross sectional view of FIG. 2 is enlarged.

As illustrated in FIG. 2 and FIG. 3, the casing 11 contains a visor portion 17, which is continuous with the first right partition wall 12a and extends inward, toward the light-receiving space 14. On the inner surface of the visor portion 17, a slope 17a that is inclined rightward in the Y2 direction is formed. The casing 11 is made of a plastic material having any color such as black or dark green. The inner surface of the visor portion 17 and the slope 17a are flat surfaces and thus easily reflect light. A small wall 18 is integrally formed on the left side of the first right partition wall 12a, and a light passage 19 is open between the visor portion 17 and the small wall 18.

As illustrated in FIG. 2, a board 21 is attached to the rear side (Y2 side) of the casing 11. The board 21 is tightly attached to the first right partition wall 12a, the first left partition wall 12b, the second right partition wall 13a, the second left partition wall 13b, and the right and left end walls 11a and 11b of the casing 11. The board 21 covers the rear side (Y2 side) of the light-receiving space 14, the first right light-emitting space 15a, the first left light-emitting space 15b, the second right light-emitting space 16a, and the second left light-emitting space 16b.

A light receiving device 22 is mounted in a center area of a front surface of the board 21 facing in the Y1 direction. The light receiving device 22 is a photodiode or a phototransistor, for example, and is disposed in a center area of the light-receiving space 14. A monitor-light-emitting device 23 is disposed on the front surface of the board 21. The monitor-light-emitting device 23 is positioned inside a small space defined by the first right partition wall 12a, the visor portion 17, and the small wall 18.

A first right detection-light-emitting device 24a and a second right detection-light-emitting device 25a are mounted on the front surface of the board 21 on the right side of FIG. 2. The first right detection-light-emitting device 24a is disposed in the first right light-emitting space 15a and the second right detection-light-emitting device 25a is disposed in the second right light-emitting space 16a. A first left detection-light-emitting device 24b and a second left detection-light-emitting device 25b are mounted on the front surface of the board 21 on the left side of FIG. 2. The first left detection-light-emitting device 24b is disposed in the first left light-emitting space 15b and the second left detection-light-emitting device 25b is disposed in the second left light-emitting space 16b.

The monitor-light-emitting device 23, the first right detection-light-emitting device 24a, the second right detection-light-emitting device 25a, the first left detection-light-emitting device 24b, and the second left detection-light-emitting device 25b are infrared-light-emitting diodes.

As illustrated in FIG. 2, a light-guiding member 30 is attached to the front side (Y1 side) of the casing 11. Preferably, the light-guiding member 30 is made of a transparent or semi-transparent material having a total luminous transmittance of 70% or higher, such as an acrylic resin.

As illustrated in FIG. 2 and FIG. 3, a condenser 31 is formed in a center area of the light-guiding member 30. The condenser 31 protrudes rearward (in the Y2 direction) and is positioned in the light-receiving space 14. A Y2-side end face of the condenser 31 is a flat light-emerging surface 31a and faces the light receiving device 22 in close proximity to the light receiving device 22. The light-emerging surface 31a may be a convex lens surface that causes the emerging light to converge on the light receiving device 22.

The condenser 31 has a right slope 32a and a left slope 32b. The right slope 32a is continuous with the right end of the light-emerging surface 31a and extends rightward of FIGS. 2 and 3 toward the front (in the Y1 direction). The left slope 32b is continuous with the left end of the light-emerging surface 31a and extends leftward of FIGS. 2 and 3 toward the front (in the Y1 direction).

As illustrated in FIG. 2 and FIG. 3, the light-guiding member 30 includes a right light-guiding portion 33a, which extends rightward from the end of the right slope 32a. The right light-guiding portion 33a has a uniform thickness T1 in the front-rear direction. A step portion 34a is formed in a right end portion of the right light-guiding portion 33a, and a stopper surface 35a is formed on the rear-side (the Y2 side) end of the step portion 34a. A first right detection-light transmitting portion 36a is formed on the right side of the stopper surface 35a. A stopper surface 37a is formed on the right side of the first right detection-light transmitting portion 36a. A second right detection-light transmitting portion 38a is formed on the right side of the stopper surface 37a.

The first right detection-light transmitting portion 36a has a uniform thickness T2 in the front-rear direction. The second right detection-light transmitting portion 38a has a uniform thickness T3 in the front-rear direction. The thickness T2 and the thickness T3 are larger than the thickness T1 of the right light-guiding portion 33a. The thickness T2 of the first right detection-light transmitting portion 36a and the thickness T3 of the second right detection-light transmitting portion 38a may be the same or the thickness T3 may be larger than the thickness T2.

As illustrated in FIG. 2, a left light-guiding portion 33b, a step portion 34b, a stopper surface 35b, a first left detection-light transmitting portion 36b, a stopper surface 37b, and a second left detection-light transmitting portion 38b are formed on the left side of the condenser 31. The light-guiding member 30 has a bilaterally symmetric structure.

As illustrated in FIG. 3, the stopper surface 35a abuts against the top end of the first right partition wall 12a and the stopper surface 37a abuts against the top end of the second right partition wall 13a. As illustrated in FIG. 2, the stopper surface 35b abuts against the top end of the first left partition wall 12b and the stopper surface 37b abuts against the top end of the second left partition wall 13b.

In this arrangement, the first right detection-light-emitting device 24a faces the first right detection-light transmitting portion 36a and the second right detection-light-emitting device 25a faces the second right detection-light transmitting portion 38a. In addition, the first left detection-light-emitting device 24b faces the first left detection-light transmitting portion 36b and the second left detection-light-emitting device 25b faces the second left detection-light transmitting portion 38b.

As illustrated in FIG. 2 and FIG. 3, a protrusion 39a, which is a portion of the light-guiding member 30 protruding toward the rear (in the Y2 direction), is formed integrally with the light-guiding member 30 at a position between the first right detection-light-emitting device 24a and the second right detection-light-emitting device 25a. The protrusion 39a has a right guide slope 39b that faces the second right detection-light-emitting device 25a. The right guide slope 39b is inclined so as to become gradually separated from the second right detection-light-emitting device 25a toward the rear (in the Y2 direction).

As illustrated in FIG. 2, a protrusion 39c is also formed integrally with the light-guiding member 30 at a position between the first left detection-light-emitting device 24b and the second left detection-light-emitting device 25b. The protrusion 39c has a left guide slope 39d that faces the second left detection-light-emitting device 25b. The right guide slope 39b is left-right symmetric to the left guide slope 39d.

Figure 4:
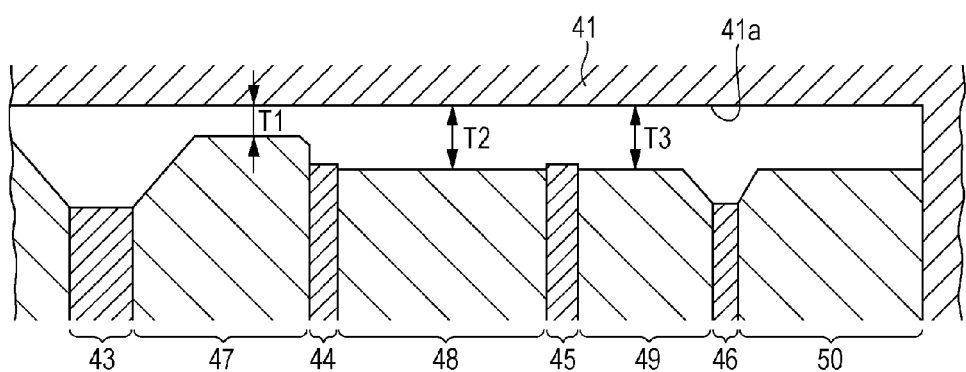
FIG. 4 is a plan view of a die set used for molding a light-guiding member.

FIG. 4 illustrates a mold set for injection molding used for molding the light-guiding member 30. A fixed mold 41 has a flat face 41a facing a cavity. A front surface 30a of the light-guiding member 30 facing to the front (in the Y1 direction) is molded with the flat face 41a of the fixed mold 41 so as to be flat. As illustrated in FIG. 4, fixed molds 43, 44, 45, and 46 face the fixed mold 41. The light-emerging surface 31a of the condenser 31 is molded with the fixed mold 43. The stopper surface 35a is molded with the fixed mold 44 and the stopper surface 37a is molded with the fixed mold 45. An end surface of the protrusion 39a is molded with the fixed mold 46.

A part-molding mold 47 is placed between the fixed mold 43 and the fixed mold 44. A part-molding mold 48 is placed between the fixed mold 44 and the fixed mold 45. A part-molding mold 49 is placed between the fixed mold 45 and the fixed mold 46. A part-molding mold 50 is placed between the fixed mold 46 and the fixed mold 41.

Changing the shape of the part-molding mold 47 enables adjustments of the angle of a right slope 32a illustrated in FIG. 3 and the thickness T1 of the right light-guiding portion 33a. Changing the shape of the part-molding mold 48 enables an adjustment of the thickness T2 of the first right detection-light transmitting portion 36a. Changing the shapes of the part-molding mold 49 and the part-molding mold 50 enables an adjustment of the thickness T3 of the second right detection-light transmitting portion 38a. Changing the shape of the part-molding mold 50 enables an adjustment of the angle of the right guide slope 39b. The left half of the light-guiding member 30 is also molded in the same manner.

As illustrated in FIG. 2 and FIG. 3, the front side of the light-guiding member 30 is covered by a cover 51. The cover 51 functions as a filter that preferentially allows transmission of infrared rays.

Now, a detecting operation of the optical sensor 10 will be described.

In the optical sensor 10, the first right detection-light-emitting device 24a, the second right detection-light-emitting device 25a, the first left detection-light-emitting device 24b, and the second left detection-light-emitting device 25b sequentially emit light at different timings. Immediately after each detection-light-emitting device emits light, the monitor-light-emitting device 23 emits light. For example, the light emission sequence is as follows: the first right detection-light-emitting device 24a, the monitor-light-emitting device 23, the first left detection-light-emitting device 24b, the monitor-light-emitting device 23, the second right detection-light-emitting device 25a, the monitor-light-emitting device 23, the second left detection-light-emitting device 25b, and the monitor-light-emitting device 23.

As illustrated in FIG. 3, monitor light emitted from the monitor-light-emitting device 23 is transmitted to the light-receiving space 14 through the light passage 19 defined by the visor portion 17 and the small wall 18. As represented by the optical path i, the majority of the monitor light is directly supplied to and received by the light receiving device 22 in the light-receiving space 14. As represented by the optical path ii, the minority of the monitor light passes through the light passage 19 and hits the right slope 32a of the condenser 31, but is less likely to penetrate into the light-guiding member 30 since the incident angle θ of the monitor light to the right slope 32a is less than 90 degrees.

Due to the angle of the slope 17a of the visor portion 17, the monitor light emitted from the monitor-light-emitting device 23 negligibly penetrates into the light-guiding member 30 but easily and directly penetrates into the light receiving device 22. Thus, the intensity of the monitor light received by the light receiving device 22 is easily adjustable by performing operations such as controlling electric currents that are to be supplied to the monitor-light-emitting device 23.

As represented by the optical path iii, part of light emitted from the first right detection-light-emitting device 24a penetrates into the light-guiding member 30, propagates inside the light-guiding member 30, emerges from the light-emerging surface 31a of the condenser 31, and is supplied to the light receiving device 22 as first reference light. As represented by the optical path iv, the remaining part of light emitted from the first right detection-light-emitting device 24a passes through the first right detection-light transmitting portion 36a and emerges to the front (in the Y1 direction).

As represented by the optical path v, part of light emitted from the second right detection-light-emitting device 25a penetrates into the light-guiding member 30 and is used as second reference light. As represented by the optical path vi, since the right guide slope 39b faces the second right detection-light-emitting device 25a, another part of light emitted from the second right detection-light-emitting device 25a penetrates into the light-guiding member 30 from the right guide slope 39b and is used as second reference light. The second reference light propagates inside the light-guiding member 30, emerges from the light-emerging surface 31a of the condenser 31, and is supplied to the light receiving device 22. As represented by the optical path vii, the remaining part of light emitted from the second right detection-light-emitting device 25a passes through the second right detection-light transmitting portion 38a and emerges to the front (in the Y1 direction).

Since the second right detection-light-emitting device 25a is positioned farther from the light receiving device 22 than the first right detection-light-emitting device 24a is, the second reference light emitted from the second right detection-light-emitting device 25a is more likely to be attenuated inside the light-guiding member 30 than the first reference light emitted from the first right detection-light-emitting device 24a. Despite the attenuation, since the right guide slope 39b faces the second right detection-light-emitting device 25a, the amount of second reference light emitted from the second right detection-light-emitting device 25a and penetrating into the light-guiding member 30 is larger than the amount of first reference light emitted from the first right detection-light-emitting device 24a and penetrating into the light-guiding member 30. By adjusting the amount of emission and the amount of attenuation of the second reference light, the difference between the amount of first reference light received and detected by the light receiving device 22 and the amount of second reference light received and detected by the light receiving device 22 can be reduced, or preferably these amounts can be made substantially equal to each other.

Between the condenser 31 and the first right detection-light transmitting portion 36a, a right light-guiding portion 33a having a small thickness T1 in the front-rear direction is disposed. The right light-guiding portion 33a has a small area of cross section. Thus, when the first reference light that has been emitted from the first right detection-light-emitting device 24a, which is located closer to the light receiving device 22, and has penetrated into the light-guiding member 30 passes through the optical path viii, the amount of first reference light is limited in the right light-guiding portion 33a. By limiting the amount of first reference light, the difference between the amount of first reference light received and detected by the light receiving device 22 and the amount of second reference light received and detected by the light receiving device 22 can be further reduced, or these amounts can be made substantially equal to each other.

Thus, it is easy to make the received amounts of three types of light coincide with one another, the three types of light being the monitor light emitted from the monitor-light-emitting device 23 and received by the light receiving device 22, and the first reference light and the second reference light that propagates in the light-guiding member 30 and is supplied to the light receiving device 22.

As represented by the optical paths iv and vii, part of light emitted from the first right detection-light-emitting device 24a and the second right detection-light-emitting device 25a is transmitted to the front (in the Y1 direction) through the light-guiding member 30 and the cover 51. When a hand or the like, which is a target object, approaches the front of the panel 3 illustrated in FIG. 1, part of the light that has been transmitted through the cover 51 is reflected off the hand or the like and becomes reflected detection light. The reflected detection light is transmitted through the cover 51 and is supplied to the front surface 30a of the light-guiding member 30. The reflected detection light, which has been reflected off the hand, converges on the condenser 31 from the front surface 30a since the condenser 31 is formed at a center portion of the light-guiding member 30 and has the right slope 32a and a left slope 32b that face each other while being spaced farther apart toward the front (in the Y1 direction). The reflected detection light taken into the condenser 31 is converged by the right slope 32a and the left slope 32b and finally supplied to the light receiving device 22. Thus, the light receiving device 22 can efficiently receive the reflected detection light.

The same detecting operation as described above is performed on the light emitted from the first left detection-light-emitting device 24b and the second left detection-light-emitting device 25b, which are disposed on the left side of the optical sensor 10.

Figure 5A:
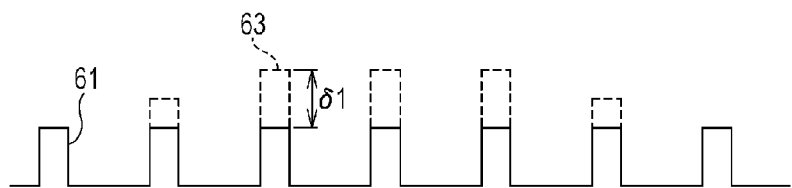
FIGS. 5A and 5B illustrate waveforms observed in a detecting operation from which the natural light is excluded.
Figure 5B:
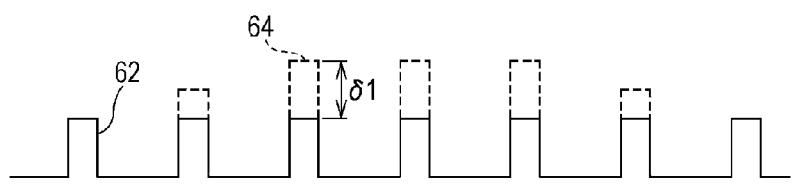
Figure 6A:
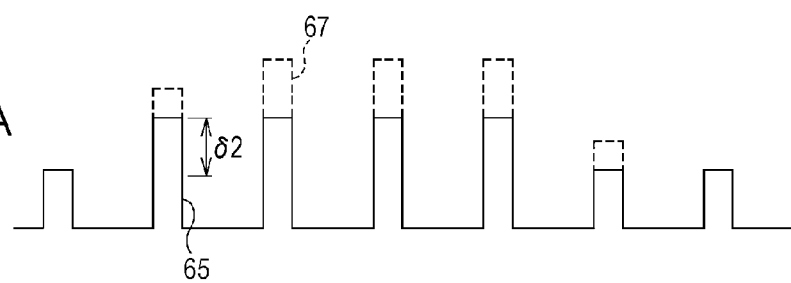
FIGS. 6A and 6B illustrate waveforms observed in a detecting operation when the natural light received by the light receiving device is taken into consideration.
Figure 6B:
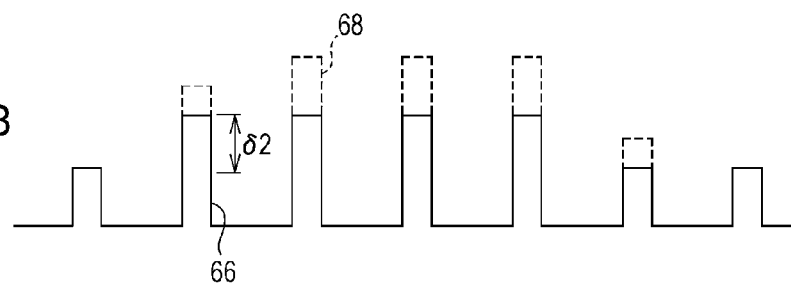

FIGS. 5A, 5B, 6A and 6B illustrate a detecting operation performed by the optical sensor 10. FIG. 5A and FIG. 6A illustrate the amount of light received by the light receiving device 22 when the first right detection-light-emitting device 24a emits light. FIG. 5B and FIG. 6B illustrate the amount of light received by the light-receiving device when the monitor-light-emitting device 23 emits light. Since the same operation is performed when the detection-light-emitting devices 24b, 25a, and 25b emit light, the case where the first right detection-light-emitting device 24a emits light is only described below.

FIGS. 5A and 5B show detection outputs from which the effect of the natural light such as sunlight is excluded. The waveform drawn with the solid line in FIG. 5A represents the light amount 61 received by the light receiving device 22 when the first right detection-light-emitting device 24a emits light in the state where a human hand or another object is not present in front of the optical sensor 10. The waveform drawn with the solid line in FIG. 5B represents the light amount 62 received by the light receiving device 22 when the monitor-light-emitting device 23 emits light. The controller compares the light amount 61, received by the light receiving device 22 when the first right detection-light-emitting device 24a emits light, and the light amount 62, received by the light receiving device 22 when the monitor-light-emitting device 23 emits light immediately after the first right detection-light-emitting device 24a emits light. Then, a current required to match the received light amount 62 with the received light amount 61 is supplied to the monitor-light-emitting device 23.

In the optical sensor 10, the intensity of light emission of each light-emitting device is adjusted such that the light amount 61 received by the light receiving device 22 when either one of the detection-light-emitting devices emits light coincides with the light amount 62 received by the light receiving device 22 when the monitor-light-emitting device 23 emits light immediately after the detection-light-emitting device emits light. For this reason, when a hand or another object is not present in front of the optical sensor 10, the received light amount 61 and the received light amount 62 coincide with each other and thus the current supplied to the monitor-light-emitting device 23 is not changed.

When a human hand or the like approaches the front of the optical sensor 10, the light that has been emitted from the first right detection-light-emitting device 24a and has passed through the light-guiding member 30 is reflected off the hand or the like and is received by the light receiving device 22. Thus, the light amount 63 received by the light receiving device 22 when the first right detection-light-emitting device 24a emits light is increased further than the light amount 61 by 61, as indicated by the broken lines in FIG. 5A. In this case, the current flowing through the monitor-light-emitting device 23 is increased such that the light amount 64 received by the light receiving device 22 when the monitor-light-emitting device 23 emits light immediately after the first right detection-light-emitting device 24a emits light coincides with the light amount 63. The controller recognizes an approach of a human hand or the like to the front of the optical sensor 10 by monitoring the amount of an increase in the current flowing through the monitor-light-emitting device 23.

FIGS. 6A and 6B show detection outputs in which the effect of the natural light such as sunlight is included. The waveform drawn with the solid line in FIG. 6A represents the light amount 65 received by the light receiving device 22 when the first right detection-light-emitting device 24a emits light in the state where a human hand or another object is not present in front of the optical sensor 10. Since the natural light penetrates into the light-guiding member 30, the light receiving device 22 receives not only the first reference light supplied from the first right detection-light-emitting device 24a, but the natural light. Thus, the received light amount 65 is larger than the received light amount 61 illustrated in FIG. 5A by $\delta 2$ corresponding to the amount of natural light.

As illustrated in FIG. 6B, when the monitor-light-emitting device 23 emits light, the light receiving device 22 receives not only the monitor light but the natural light, and thus the received light amount 66 is increased. Here, the received amount of natural light remains substantially the same as in the case illustrated in FIG. 6A. Thus, the amount 62 of an increase in the received light amount 66 is the same as the amount $\delta 2$ of an increase in the received light amount 65 illustrated in FIG. 6A. Consequently, the current supplied to the monitor-light-emitting device 23 is not increased, and the controller determines that a hand or the like is not present in front of the optical sensor 10.

As illustrated in FIG. 6A, when a hand or the like approaches the front of the optical sensor 10, the light amount 67 received by the light receiving device 22 when the first right detection-light-emitting device 24a emits light is increased further than the light amount 65, as indicated by the broken lines. In this case, as illustrated in FIG. 6B, the current supplied to the monitor-light-emitting device 23 is increased such that the light amount 68 received by the light receiving device 22 when the monitor-light-emitting device 23 emits light coincides with the received light amount 67. The controller determines that a human hand or the like approaches the front of the optical sensor 10 by using an increase in the current supplied to the monitor-light-emitting device 23.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. An optical sensor comprising:
   a monitor-light-emitting device that emits light at a first timing;
   an emitting device that emits light at a second timing different from the first timing;
   a light receiving device arranged adjacent to the monitor-light-emitting device and the light-emitting device; and
   a light-guiding member disposed in front of the light-emitting device and the light receiving device;

wherein reference light corresponding to the light emitted from the light-emitting device propagates through the light-guiding member and is received by the light receiving device;

wherein light emitted from the light-emitting device is transmitted through the light-guiding member, and is reflected by a target object located in front of the optical sensor, and is guided back by the light-guiding member to the light receiving device;

wherein a visor portion is disposed between the monitor-light-emitting device and the light-guiding member, such that light emitted from the monitor-light-emitting device is directly incident on the light receiving device; and wherein presence or absence of target object is determined based on a measured amount of light received by the light receiving device when the light-emitting device emits light and a measured amount of light received by the light receiving device when the monitor-light-emitting device emits light.

2. The optical sensor according to claim 1,
wherein a portion of the light-guiding member is formed as a condenser having a light-emerging surface and a slope, the light-emerging surface facing the light receiving device, the slope extending from the light-emerging surface such that the condenser is widened in a lateral direction, in which the monitor-light-emitting device and the light-emitting device are arranged, toward the front, and wherein the monitor-light-emitting device faces the slope.

3. The optical sensor according to claim 2,
wherein the light-guiding member includes a light transmitting portion, which faces the light-emitting device, and a light-guiding portion, which is positioned between the light transmitting portion and the slope, and wherein a thickness of the light-guiding portion in a front-to-rear direction is less than a thickness of the light transmitting portion in the front-to-rear direction.

4. The optical sensor according to claim 3, wherein the light-guiding portion and the light transmitting portion are molded by different part-molding molds so as to have different contours.

5. The optical sensor according to claim 4,
wherein the light-emitting device includes a first light-emitting device and a second light-emitting device, wherein the second light-emitting device is disposed farther from the light receiving device than the first light-emitting device, and wherein a guide slope is formed in a portion of the light-guiding member between the first light-emitting device and the second light-emitting device, the guide slope being inclined in such a direction as to become gradually separated from the second light-emitting device toward the rear.

6. An optical sensor comprising:
a monitor-light-emitting device that emits light at a first timing;
a detection-light-emitting device that emits light at a second timing different from the first timing;
a light receiving device arranged adjacent to the monitor-light-emitting device and the detection-light-emitting device; and
a light-guiding member disposed in front of the detection-light-emitting device and the light receiving device;

wherein reference light corresponding to the light emitted from the detection-light-emitting device propagates through the light-guiding member and is received by the light receiving device;

wherein light emitted from the detection-light-emitting device is transmitted through the light-guiding member, and is reflected by a target object located in front of the optical sensor, and is guided back by the light-guiding member to the light receiving device;

wherein a visor portion is disposed between the monitor-light-emitting device and the light-guiding member, such that light emitted from the monitor-light-emitting device is directly incident on the light receiving device; and wherein presence or absence of target object is determined based on a measured amount of light received by the light receiving device when the detection-light-emitting device emits light and a measured amount of light received by the light receiving device when the monitor-light-emitting device emits light.

7. The optical sensor according to claim 6,
wherein a portion of the light-guiding member is formed as a condenser having a light-emerging surface and a slope, the light-emerging surface facing the light receiving device, the slope extending from the light-emerging surface such that the condenser is widened in a lateral direction, in which the monitor-light-emitting device and the detection-light-emitting device are arranged, toward the front, and wherein the monitor-light-emitting device faces the slope.

8. The optical sensor according to claim 7,
wherein the light-guiding member includes a detection-light transmitting portion, which faces the detection-light-emitting device, and a light-guiding portion, which is positioned between the detection-light transmitting portion and the slope, and wherein a thickness of the light-guiding portion in a front-to-rear direction is less than a thickness of the detection-light transmitting portion in the front-to-rear direction.

* * * * *